United States Patent Office 3,636,156
Patented Jan. 18, 1972

3,636,156
PROCESS FOR THE DIRECT PRODUCTION OF KETONES FROM OLEFINS
Atsumu Ozaki and Yoshihiko Morooka, Tokyo, Japan, assignors to Idemitsu Petrochemical Co., Ltd.
No Drawing. Filed Oct. 21, 1968, Ser. No. 769,369
Claims priority, application Japan, Apr. 25, 1968, 43/27,839
Int. Cl. C07c 45/04
U.S. Cl. 260—597 R                           5 Claims

ABSTRACT OF THE DISCLOSURE

A feed gas comprising an olefin, steam and oxygen is subjected under normal or raised pressure at 150–300° C. to a vapor phase one step reaction. The reaction is conducted in the presence of a complex oxide catalyst comprising molybdenum oxide and at least one of the oxides selected from tin oxide, iron oxide or cobalt oxide.

---

This invention relates to a process for the production of ketones in one step by reacting an olefin with steam and oxygen in the presence of a specific catalyst.

Hitherto, a two-step process wherein an olefin is hydrated with sulfuric acid and the resulting alcohol is dehydrogenated to a ketone or Wacker process wherein an olefin is oxidized in liquid phase with air or oxygen in the presence of a palladous chloride/cupric chloride catalyst have been adopted as a means for the production of ketones. However, several demerits are pointed out in these processes; in the former process two reactions are needed and in the latter process the catalyst are expensive and the liquid reaction mixture being made acidic with hydrochloric acid results in corrosion of the reactor.

As a method of the production of ketones from olefins in one step by a catalytic reaction, the following reaction is possible:

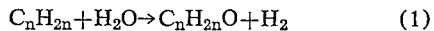

$$C_nH_{2n} + H_2O \rightarrow C_nH_{2n}O + H_2 \quad (1)$$

The reaction of the Formula 1 is not necessarily advantageous for the production of ketones in a good yield since the equilibrium of the reaction is not so favorable and hydrogen gas formed as by-product may possibly be reacted in the presence of the catalyst with the starting olefin to form a paraffin.

On the other hand, a reaction which eliminates hydrogen formed as by-product by oxidation, i.e., a reaction for effecting at the same time both of hydration of an olefin and oxydehydrogenation of alcohol as shown below is suitable for the production of ketones because of its reaction equilibrium advantageous toward the product.

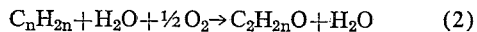

$$C_nH_{2n} + H_2O + \tfrac{1}{2}O_2 \rightarrow C_2H_{2n}O + H_2O \quad (2)$$

Hitherto, a catalyst effective for the reaction (2) has not been known. As the result of researches, the present inventors discovered a catalyst system capable of promoting this reaction selectively. Namely, it has been found that the reaction of the Formula 2 is promoted by the use of a catalyst comprising molybdenum oxide as the first component and either of cobalt oxide, tin oxide and iron oxide or a complex oxide of these oxides as the second component. By the aid of this catalyst, ketones are formed in one step from a gaseous mixture of an olefin, steam and oxygen or air.

The proportion of molybdenum oxide to the other metal oxides in the catalyst is preferably adjusted so that the ratio of molybdenum atom to all of the metal atoms in the catalyst is 0.005–0.5, especially 0.05–0.3. If the ratio is below 0.005, the activity of the catalyst is nearly lost so that the oxidation does not take place. On the other hand, if the ratio is above 0.5, the formation of other oxidation products such as carbon dioxide is so increased that the selectivity of ketones produced becomes smaller. The catalyst is prepared by adding to an aqueous solution of amomnium molybdate a given amount of a nitrate, organic acid salt, chloride or hydroxide of the other metal, and baking, after coprecipitation or evaporation to dryness, the solid matter to decompose it to oxides. Powders of the oxides are tabletted and baked for 3 hours at about 500° C. to prepare the catalyst ready to use. In the case of a catalyst prepared as a mechanical mixture of molybdenum oxide and other metal oxides baked separately, the formation of carbon dioxide in the reaction is so much that the catalyst is not suitable for the synthesis of this invention. When this catalyst is baked for several hours at 500° C. after mechanical blending of the components, however, it can be used as the catalyst for the ketone synthesis of this invention. The powdery complex oxides may effectively be supported in an appropriate manner on a support such as alumina, silicon carbide, silica gel or celite.

An adequate temperature range of the reaction depends on the kind of the catalyst as follows: 150–300° C. in the catalyst system of molybdenum oxide and cobalt oxide, 80–200° C. in the catalyst system of molybdenum oxide and tin oxide, and 150–300° C. in the catalyst system of molybdenum oxide and iron oxide are preferable. However, the selectivity of the catalysts for the production of ketones increases as the reaction temperature decreases. At the high temperaure, the amount of by-products due to excessive oxidation to carbon dioxide and the like increases. Therefore, it is desirable to conduct the reaction at a low temperature which permits no excessive oxidation.

Whatever mixing ratio can be adopted for the mixture of olefin, steam and oxygen in the feed gas. In order to increase the conversion of olefin, it is desirable to raise the mixing ratio of steam to olefin to 2–10 in molar basis. It is also desirable to adjust the mixing ratio of oxygen to olefin to less than 1, in order to enhance selectivity to ketones. As diluting gas, nitrogen can be employed but the use of carbon dioxide, paraffin or the like is also possible. The reaction is carried out under pressure of 2–20 atm. but the reaction at normal pressure is also possible.

In this invention, economically advantageous production of ketones becomes possible by optimizing the reaction conditions considering the characteristics of various catalysts. The recycle of the unreacted gas, etc. may be preferable. This invention will fully be illustrated by the following examples.

EXAMPLE 1

An aqueous solution of ammonium molybdate was mixed with an aqueous solution of cobalt nitrate under such condition that the metal atom ratio of Mo:Co became 1:9. After evaporation of the mixture to dryness, the residue was decomposed, by baking it on sand bath in the air, to oxides. The powder of the resulting oxide mixture was shaped to tablets having a diameter of 4 mm. and length of 3 mm. and then baked for 3 hours at 550° C. The catalyst thus prepared was charged in a tubular reactor and a gaseous mixture of propylene, oxygen, steam and nitrogen in the ratio of 2:3:3:2 was passed therethrough at 217° C. at a space velocity of 670 cc./ catalyst cc. hr. The reaction was continuously carried out for about 3 hours and the product was analyzed by means of gas chromatography. An average result of the reaction for 3 hours was as follows: the conversion of propylene 6.2%, the yield of acetone based on the reacted propylene 71%, acetic acid and carbon dioxide each about 11%, and a small amount of acetaldehyde (3%) and carbon monoxide (4%) as by-products.

EXAMPLE 2

Stannic hydroxide was impregnated with an aqueous solution of ammonium molybdate under such condition that the metal atom ratio of Mo:Sn became 1:9. After evaporation of water to dryness, the residue was decompose, by baking it on sand bath in the air, to oxides which, after shaping to tablets, were baked for 3 hours at 550° C. to prepare a ctalyst. A gaseous mixture of propylene, oxygen, steam and nitrogen in the ratio of 2:3:3:2 was passed through the catalyst at 130° C. at a space velocity of 670 cc./catalyst cc. hr. The result of the analysis of the reaction product was as follows: the conversion of propylene 11.1%, the yield of acetone based on the reacted propylene 86%, acetaldehyde 5.5%, acetic acid 3.0% and carbon dioxide 5.5%.

EXAMPLE 3

Using a ferric oxide/molybdenum oxide catalyst prepared in a manner similar to that of Example 1, the reaction was carried out at 230° C. under the same condition as that of Example 1 and the following result was obtained: the conversion of propylene 15.0%, the yield of acetone based on the reacted propylene 76.5%, acetaldehyde 3.0%, acetic acid 1.7%, carbon dioxide 13.1% and carbon monoxide 5.7%.

EXAMPLE 4

Using a cobalt oxide/molybdenum oxide catalyst prepared in a manner similar to that of Example 1, the reaction was carried out by supplying a gaseous mixture of 1-butene, oxygen, steam and nitrogen at a space velocity of 600 cc./catalyst cc. hr. and the following result was obtained: at 210° C., the conversion of 1-butene 3.3%, the yield of methyl ethyl ketone based on the reacted butene 68.7%, acetic acid 16.1% and carbon monoxide and dioxide 17.2%, at 222° C., the conversion rate 4.0%, the yield of methyl ethyl ketone based on the reacted butene 56.6%, acetic acid 17.2% and carbon dioxide 24.4%. The majority of the unreacted 1-butene was isomerized to 2-butene.

What we claim is:

1. A process for the direct production of ketones from olefins, characterized by subjecting under normal or raised pressure at 80–200° C. a feed gas comprising a $C_3$ to $C_4$ aliphatic hydrocarbon monoolefin, steam and oxygen to a vapor phase one step reaction in the presence of a complex oxide catalyst comprising molybdenum oxide and tin oxide, the metal atom ratio [Mo/(Mo+Sn)] being 0.005–0.5.

2. A process as claimed in claim 1 wherein the olefin is propylene or butene.

3. A process as claimed in claim 1 wherein the olefin is propylene.

4. A process as claimed in claim 1 wherein the olefin is butene.

5. A process as claimed in claim 1 wherein the olefin is butene-1.

References Cited

UNITED STATES PATENTS 2,410,642   11/1946   Farkas et al. _____ 260—597 R

BERNARD HELFIN, Primary Examiner

U.S. Cl. X.R.

260—604 R, 533 R